(12) United States Patent
Kwon et al.

(10) Patent No.: US 10,277,063 B2
(45) Date of Patent: Apr. 30, 2019

(54) APPARATUS FOR MANAGING POWER OF A VEHICLE AND METHOD OF CONTROLLING THE SAME

(71) Applicants: HYUNDAI MOTOR COMPANY, Seoul (KR); KYUNGSHIN CO., LTD., Incheon (KR)

(72) Inventors: Hae Yun Kwon, Bucheon-si (KR); Soon Il Bang, Hwaseong-si (KR); Young Jong Lee, Seoul (KR); Hyun Wook Kim, Seoul (KR); Yun Suk Choi, Yeonsu-gu (KR)

(73) Assignees: Hyundai Motor Company, Seoul (KR); Kyungshin Co., Ltd., Incheon (KR)

( * ) Notice: Subject to any disclaimer, the term of this patent is extended or adjusted under 35 U.S.C. 154(b) by 146 days.

(21) Appl. No.: 15/205,139

(22) Filed: Jul. 8, 2016

(65) Prior Publication Data

US 2017/0279296 A1    Sep. 28, 2017

(30) Foreign Application Priority Data

Mar. 24, 2016    (KR) .......................... 10-2016-0035399

(51) Int. Cl.
*H02J 7/00* (2006.01)
*H02J 7/16* (2006.01)
*B60R 16/023* (2006.01)
*B60R 16/033* (2006.01)
*H02J 9/00* (2006.01)

(52) U.S. Cl.
CPC .......... *H02J 7/166* (2013.01); *B60R 16/0238* (2013.01); *B60R 16/033* (2013.01); *H02J 9/002* (2013.01); *H02J 2007/0096* (2013.01)

(58) Field of Classification Search
CPC ....... H02J 7/166; H02J 9/002; B60R 16/0238; B60R 16/033
USPC .................. 307/10.1–10.7; 320/109; 701/22; 702/56
See application file for complete search history.

(56) References Cited

U.S. PATENT DOCUMENTS

| | | | |
|---|---|---|---|
| 6,268,663 B1* | 7/2001 | Abe ...................... | H02J 7/0032 307/10.6 |
| 2009/0212740 A1* | 8/2009 | Felps ................. | G01R 31/3606 320/134 |
| 2013/0297147 A1* | 11/2013 | Cheon .................... | B60R 16/03 701/36 |

(Continued)

FOREIGN PATENT DOCUMENTS

| | | |
|---|---|---|
| JP | H11-5500 A | 1/1999 |
| JP | 2007-196825 | 8/2007 |
| JP | 2007-237768 | 9/2007 |

(Continued)

*Primary Examiner* — Zixuan Zhou
(74) *Attorney, Agent, or Firm* — Brinks Gilson & Lione

(57) ABSTRACT

An apparatus for managing power of a vehicle and a method of controlling the same, for effectively shutting off dark current are disclosed. The method includes cutting off a first load part when a preset first time condition is satisfied, additionally cutting off a second load part when at least one of a preset second time condition or a first battery state condition is satisfied, and additionally cutting off a third load part to interrupt all loads when at least one of a preset third time condition, a second battery state condition, or a dark current state condition is satisfied.

18 Claims, 8 Drawing Sheets

(56) References Cited

U.S. PATENT DOCUMENTS

2015/0239411 A1* 8/2015 Nakajima ............. B60R 16/033
307/10.6

FOREIGN PATENT DOCUMENTS

| JP | 2010-71731 A | 4/2010 |
| JP | 2015-89714 | 5/2015 |
| JP | 2015-120465 | 7/2015 |
| JP | 5772839 | 7/2015 |
| KR | 10-1026557 | 3/2011 |
| KR | 10-1379926 | 3/2014 |

* cited by examiner

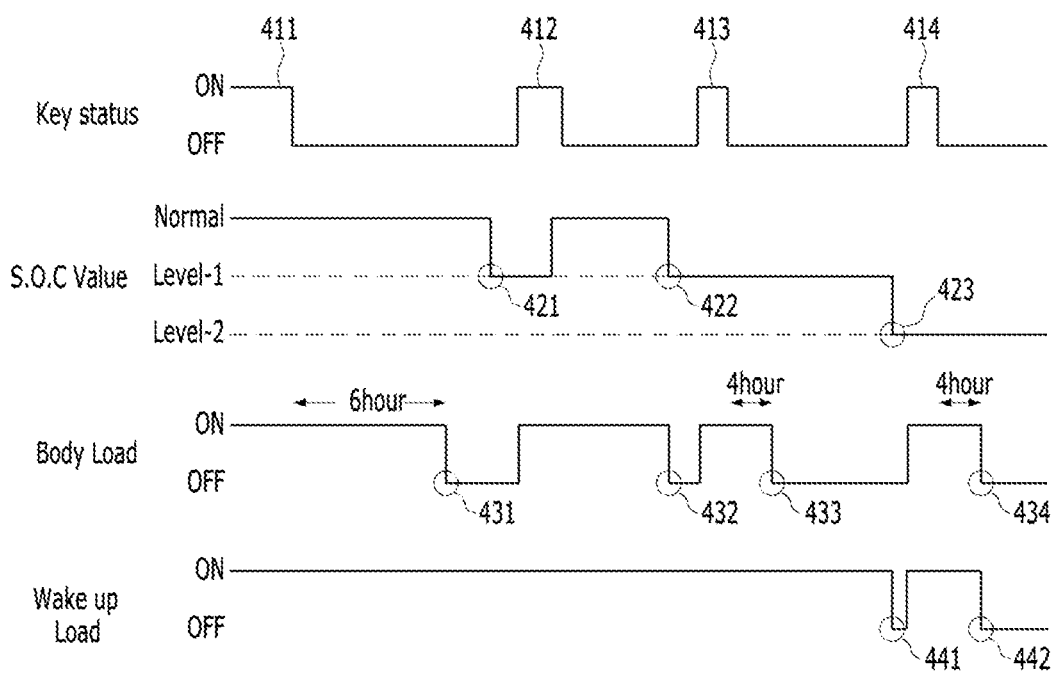

APPARATUS FOR MANAGING POWER OF A VEHICLE AND METHOD OF CONTROLLING THE SAME

This application claims the benefit of Korean Patent Application No. 10-2016-0035399, filed on Mar. 24, 2016, the entire contents of which is hereby incorporated by reference.

BACKGROUND

Field

The present disclosure relates to an apparatus for managing power of a vehicle and a method of controlling the same, for effectively shutting off dark current.

Discussion of the Related Art

In general, a vehicle includes a fuse box installed therein that includes fuses for the protection of circuits from power supplied from various electronic apparatuses. However, recently, a smart junction box (SJB) as a fuse box with a multi-function as well as a general fuse box function, which includes a micro controller (microcomputer) so as to control operating time of various relay circuits and some electronic apparatuses, has been extensively used in accordance with current trends.

FIG. 1 is a diagram illustrating an example of a configuration of a general smart junction box 100.

Referring to FIG. 1, the smart junction box 100 may include a microcomputer 110 for performing control to supply or shut off power supplied from a battery 210 to various loads in a vehicle by operating a relay and an intelligent power switch (IPS) based on a state of a vehicle switch 230 and a control signal received through a communication unit 220. In addition, the smart junction box 100 may include a fuse switch 120 that is generally turned on after a vehicle is manufactured and transferred to a customer, and the microcomputer 110 may control power supplied to the vehicle using different methods according to a state of the fuse switch 120, which will be described below with reference to FIG. 2.

FIG. 2 is a flowchart illustrating an example of a procedure for managing vehicle power in a general smart junction box.

Referring to FIG. 2, as an external switch input is generated or controller area network (CAN) communication is activated, a smart junction box may supply power to various load systems in a vehicle (S201). When a sleep mode entrance condition is satisfied (e.g., when body CAN communication enters a sleep mode, etc.) after power begins to be supplied (S202), the smart junction box may enter a sleep mode (S203) and perform an operation for shutting off dark current.

The operation for shutting off dark current may be changed according to a state of a fuse switch (S204). In detail, when the vehicle is transferred and the fuse switch is turned on, if a timer is started and predetermined time (e.g., 20 minutes) elapses (S205), a lamp load is first interrupted (S206) and when longer time (e.g., 12 hours) elapses (S207), a body electronic device load may be interrupted (S208). When the body electronic device load is interrupted, a microcomputer is powered off (S209) and a corresponding state is maintained until a preset release condition is satisfied (S210). Here, when a locking signal is received through a remote controller such as a smart key after the timer is started, the load may begin to be interrupted after a shorter time (e.g., five seconds) elapses. In addition, the preset release condition may include change in external switch input and/or CAN communication activation.

When a fuse switch is in an off state, if predetermined time (e.g., five minutes) elapses after the timer is started (S211), all loads may be cut off at one time (S222).

This may be summarized according to Table 1 below.

TABLE 1

| Interrupted load group | Switch off | Switch on | Interrupted load |
|---|---|---|---|
| Lamp load | 5 minutes | 20 minutes | Relay |
| Body load | | 12 hours | IPS |
| Multimedia | | Constant power supply | |
| Wake-up | | Constant power supply | |

However, when the aforementioned smart junction box is applied, since only limited kinds of loads such as a lamp load and a body load are cut off according a fixed time schedule, there is a limit in shutting off dark current.

SUMMARY

Accordingly, the present disclosure is directed to an apparatus for managing power of a vehicle and a method of controlling the same that substantially obviates one or more problems due to limitations and disadvantages of the related art.

An object of the present disclosure is to provide an apparatus for managing power of a vehicle and a method of controlling the same, for effectively shutting off dark current.

In particular, the present disclosure provides an apparatus for managing power of a vehicle and a method of controlling the same, for shutting off dark current in further consideration of a battery state.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling an apparatus for managing power of a vehicle includes interrupting a first load part when a preset first time condition is satisfied, additionally interrupting a second load part when at least one of a preset second time condition or a first battery state condition is satisfied, and additionally interrupting a third load part to interrupt all loads when at least one of a preset third time condition, a second battery state condition, or dark current state condition is satisfied.

In another aspect of the present disclosure, an apparatus for managing power of a vehicle includes a communication module configured to receive a state of charge (SOC) of a battery, a microcomputer, and an interrupter configured to interrupt power supplied to each of at least one load according to control of the microcomputer, wherein the microcomputer is configured to control the interrupter to interrupt a first load part when a preset first time condition is satisfied, to control the interrupter to interrupt a second load part when at least one of a preset second time condition or a first battery state condition is satisfied, and to control the interrupter to interrupt a third load part to interrupt all loads when at least one of a preset third time condition, a second battery state condition, or a dark current state condition is satisfied.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate form(s) of the disclosure and together with the description serve to explain the principle of the disclosure. In the drawings:

FIG. 4B is a diagram illustrating an example of a procedure for interrupting a load according to a form of the present disclosure;

DETAILED DESCRIPTION

Figure 1:
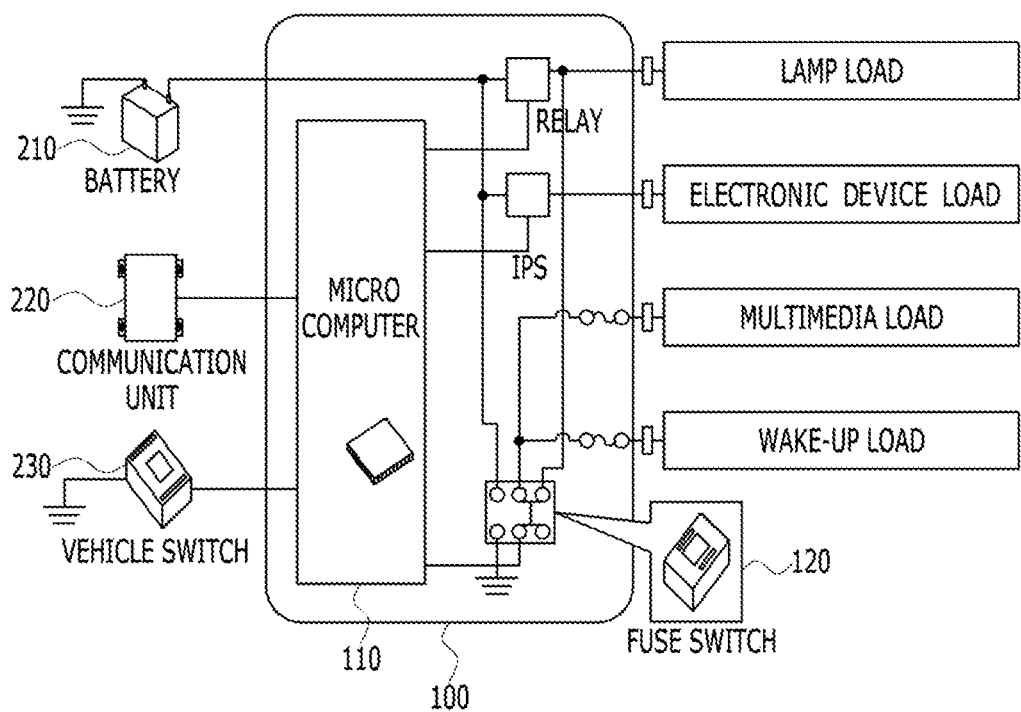
FIG. 1 is a diagram illustrating an example of a configuration of a general smart junction box.
Figure 2:
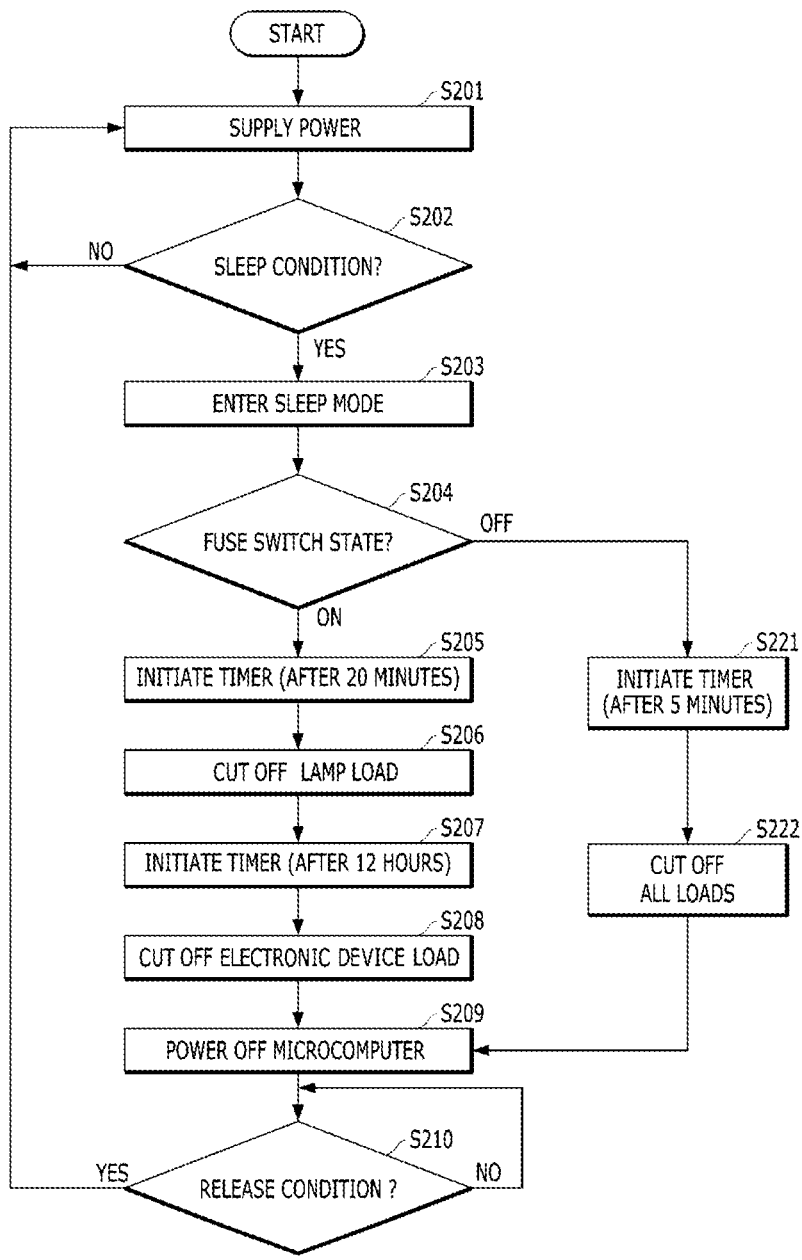
FIG. 2 is a flowchart illustrating an example of a procedure for managing vehicle power in a general smart junction box.

Hereinafter, the present disclosure will be described in detail by explaining exemplary forms of the disclosure with reference to the attached drawings. The same reference numerals in the drawings denote like elements, and a repeated explanation thereof will not be given. In addition, the suffixes "module" and "unit" of elements herein are used for convenience of description and thus can be used interchangeably and do not have any distinguishable meanings or functions.

In the description of the present disclosure, certain detailed explanations of related art are omitted when it is deemed that they may unnecessarily obscure the essence of the disclosure. The features of the present disclosure will be more clearly understood from the accompanying drawings and should not be limited by the accompanying drawings. It is to be appreciated that all changes, equivalents, and substitutes that do not depart from the spirit and technical scope of the present disclosure are encompassed in the present disclosure.

A form of the present disclosure proposes an apparatus for managing power of a vehicle, for determining a range of interrupted loads in additional consideration of a battery state as well as elapsed time in order to control shut off of dark current.

In the specification, for convenience of description, an apparatus for managing power of a vehicle is assumed to be a smart junction box (SJB) or an intelligent power module (IPM). However, this is merely exemplary and, thus, the apparatus for managing power of a vehicle may be an intelligent power gateway module (IPGM) formed by adding a configuration of a gateway of a heterogeneous communication network to a smart junction box. In addition, needless to say, the apparatus for managing power of a vehicle may be embodied by determining a battery state and requesting an SJB to perform a dark-current shut-off function by another controller.

According to a form of the present disclosure, a load may be interrupted using a timer and, simultaneously, a state of charge (SOC) of a battery may be divided into a plurality of sections and one or more load groups may be sequentially interrupted according to a section to which a SOC of the battery currently belongs. Here, although loads of FIG. 1 are grouped into four load groups, the number of load groups is assumed to be three according to the present embodiment. In addition, the load groups may be assumed to be a lamp load, a body (electronic device) load, and a wake-up load, respectively. Needless to say, this is merely exemplary and, thus, greater or fewer load groups than the three load groups may be implemented.

In forms of the present disclosure, information on an SOC of a battery may be acquired from a battery sensor. Here, since a battery sensor generally uses a local interconnect network (LIN) communication method, a controller operating as an LIN master is preferable and an engine controller generally functions as a function of the LIN master. However, when a vehicle is turned off, since the engine controller is turned off, the engine controller may not function as an LIN master. Accordingly, the battery sensor according to the present form may be connected directly to a smart junction box via CAN communication.

The aforementioned system for managing power of a vehicle will be described below with reference to FIG. 3.

Figure 3:
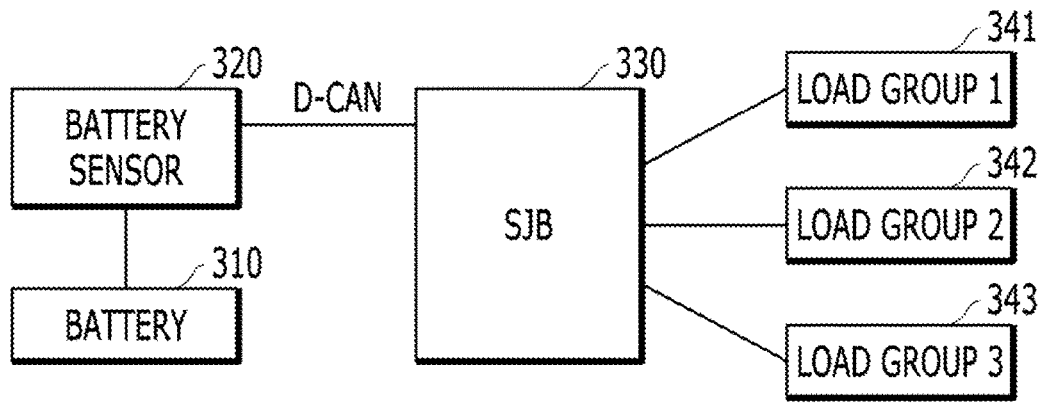
FIG. 3 is a diagram illustrating an example of a configuration of a power management system according to a form of the present disclosure.

FIG. 3 is a diagram illustrating an example of a configuration of a power management system according to a form of the present disclosure.

Referring to FIG. 3, a battery sensor 320 may detect a state of charge (SOC) of a battery 310. The battery sensor 320 may transmit the detected SOC information a smart junction box (SJB) 330 via CAN communication. The SJB 330 may sequentially interrupt load groups 1 to 3 341 to 343 according to the received SOC information and a timer. In order to interrupt the respective load groups, interrupters may be included in the SJB. In detail, a relay may be applied to the load group 1 and a latch relay may be applied to the load groups 2 and 3.

In more detail, the battery sensor 320 may periodically acquire SOC information of a battery, divide the SOC information into three sections according to two reference values, and transmit signals corresponding to the respective sections to the SJB 330.

For example, assuming that the two reference values are 75% and 65% SOC, the battery sensor 320 may transmit a normal signal, a first range signal, and a second range signal to the SJB 330 in the case of an SOC greater than 75%, an SOC of 75% or less and greater than 65%, and an SOC of 65% or less, respectively.

Such three signals (the normal signal, the first range signal, and the second range signal) may be defined as signals in one message. In this regard, when the signals are embodied as a CAN message, a new CAN message may be defied according to Table 2 below.

TABLE 2

| Message | Signal | Description | Transmit | Receive |
|---|---|---|---|---|
| BS_IGPM_BatLevInd | BS_IGPM_Batt_Level_Ind | Battery SOC indication | Battery sensor | SJB |

Referring to Table 2 above, as a message for transmitting battery SOC information (Battery SOC, Battery Level Indicator), a message of a CAN using a battery sensor as a transmit controller and an SJB as a receive controller may be defined. The corresponding message may be transmitted in the form of an event to the SJB from the battery sensor a plurality of times (e.g., five times).

In addition, a signal of the CAN message may be defined according to Table 3 below.

TABLE 3

| Characteristics | Signal | Definition |
|---|---|---|
| CAN_D Communication | BS_IGPM_Batt_Level_Ind | Charged Battery level<br>0x00: Normal<br>0x01: Step-1 (Body Load Cut)<br>0x02: Step-2 (Wakeup Load Cut) |

Referring to Table 3 above, the corresponding message may correspond to diagnostic CAN communication and a signal value may be defined to indicate battery SOC information in three steps of a normal range (0x00), a first range (0x01), and a second range (0x02).

When four hours first elapse after a key-on (IGN ON) status is changed to a key-off (IGN OFF) status, the battery sensor 320 may transmit the above message to the SJB and, then, upon checking SOC information at a frequency of 10 minutes and determining that the SOC information is changed, the battery sensor 320 may notify the SJB of information on the change. The SJB may interrupt the load group 2 (e.g., a body load) upon receiving a signal corresponding to the first range and interrupt the load group 3 (e.g., a wake-up load) upon receiving a signal corresponding to the second range, with reference to the signals of the CAN message. The load group 1 (e.g., a lamp load) may be interrupted according to elapsed time after entrance into a sleep mode.

A relationship between the aforementioned operation of a battery sensor and a state of a load is summarized according to Table 4 below.

TABLE 4

| Item | | Status | | | | |
|---|---|---|---|---|---|---|
| Condition | Key Status = On | On -> Off | | Maintain Off | | |
| | Time Condition | Four hours first elapses | | After four hours elapses, check at frequency of 10 minutes (when evel is changed) | | |
| | Battery charged value = S.O.C | Level 0 | Level 1 | Level 2 | Level 1 | Level 2 |

TABLE 4-continued

| Item | | Status | | | | |
|---|---|---|---|---|---|---|
| Load state | Lamp Load (interrupt after 20 minutes) | OFF | OFF | OFF | OFF | OFF |
| | Body Load | ON | OFF | OFF | OFF | OFF |
| | Wake-up Load | ON | ON | OFF | ON | OFF |

Referring to Table 4 above, as described above, when four hours elapses after a key status (IGN) is changed to an off state from an on state, the battery sensor may first transmit battery state information to the SJB and, then, upon checking a battery state at a frequency of 10 minutes and determining that a battery level is changed, the battery sensor may notify the SJB of information on the change. With regard to a load, a lamp load may be turned off irrespective of a battery state when 20 minutes has elapsed after entrance into a sleep mode, a body load may be interrupted when a battery state is level 1 (i.e., a first range), and a wake-up load may be additionally interrupted when a battery state is level 2 (i.e., a second range).

In addition to the lamp load, the body load and the wake-up load may be interrupted according to values of a timer and dark current, which will be described below with reference to FIG. 4A.

Figure 4A:
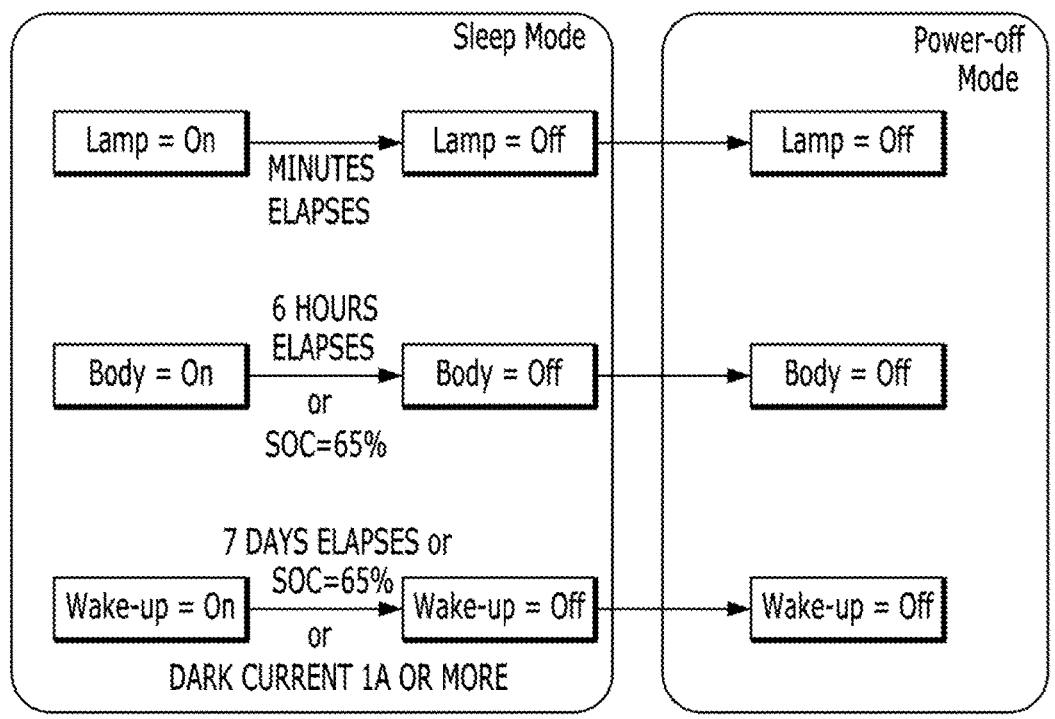
FIG. 4A is a diagram illustrating an example of a condition for shutting off dark current for each load according to a form of the present disclosure.

FIG. 4A is a diagram illustrating an example of a condition for shutting off dark current for each load according to a form of the present disclosure.

Referring to FIG. 4A, a lamp load may be turned off when 20 minutes has elapsed after entrance into a sleep mode and a body load may be turned off when an SOC is 75% or less or six hours has elapsed after entrance into a sleep mode. In addition, when an SOC is 65% or less or seven days has elapsed after entrance into a sleep mode and when dark current of 1 A or more is detected, a wake-up load may be turned off.

It would be appreciated by one of ordinary skill in the art that details values such as an SOC value, elapsed time, and dark current of FIG. 4A are exemplary and, thus, may be changed according to setting or a vehicular environment.

The procedure for interrupting a load described with reference to FIG. 4A and Table 4 will be described in terms of a time axis with reference to FIG. 4B.

FIG. 4B is a diagram illustrating an example of a procedure for interrupting a load according to a form of the present disclosure. In FIG. 4B, whether a lamp load is interrupted is dependent upon only sleep mode entrance time and, thus, the lamp load is not illustrated.

Referring to FIG. 4B, as six hours elapses after a key on 411 status is first converted into a key-off status (i.e., a sleep mode entrance condition), a body load may be turned off (431).

A battery SOC may be degraded to a first range (level 1) from a normal range after key off but may enter a normal state (i.e., charging) by second key on 412. In addition, the interrupted body load may be released by the corresponding key on 412.

Then, when the battery SOC re-enters a key-off status and is degraded to the first range after 4 hours elapses in the key-off status (422), a battery sensor may notify an SJB of this such that the body load is re-interrupted (432).

In a third key on 413 status, interruption of the body load is released, but when the battery SOC is maintained in the first range, as four hours elapses after key off, the battery sensor may notify the SJB of this such that the body load is re-interrupted (433).

Then, when the battery SOC is degraded to a second range (423), a wake-up load may also be interrupted (441) and interruption of both the body load and the wake-up load may be released according to key on 414. However, when an SOC is maintained in the second range after key off, if four hours has elapsed after key off, the body load and the wake-up load may be re-interrupted according to report of the battery sensor (434 and 442).

According to another form of the present disclosure, a power management mode of a system for managing power of a vehicle may be roughly classified into three modes including a driving mode, a standby mode, and a parking mode. Here, the parking mode may be classified into three sub-modes including an initial parking mode, a short-term parking mode, and a long-term parking mode, which will be described in more detail with reference to FIG. 5

Figure 5:
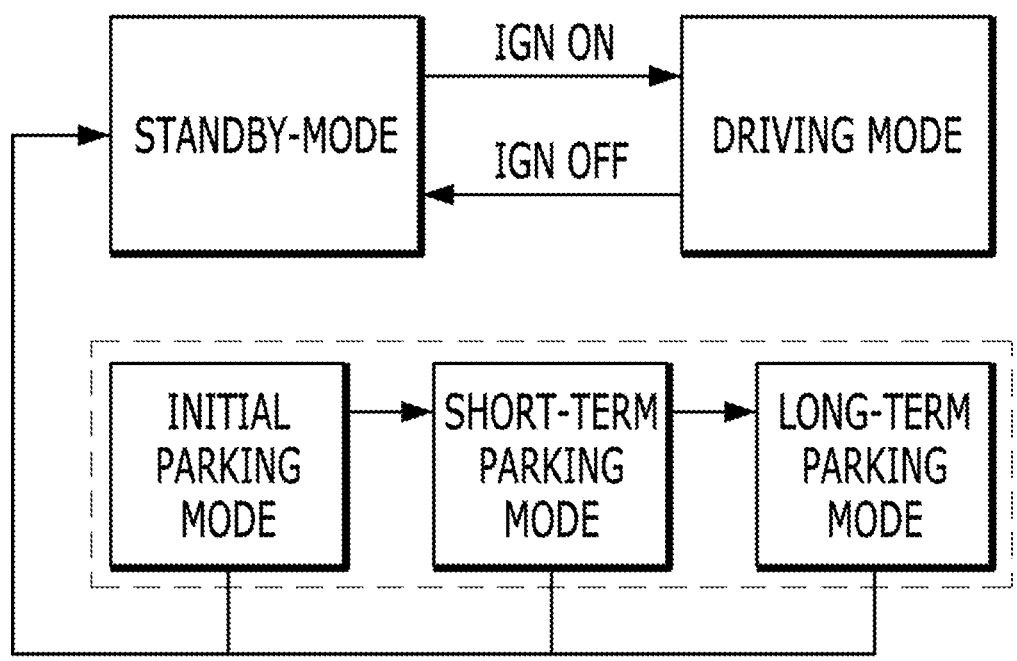
FIG. 5 is a diagram illustrating a power management mode according to another form of the present disclosure.

FIG. 5 is a diagram illustrating a power management mode according to another form of the present disclosure.

Referring to FIG. 5, the standby mode and the driving mode may transition to each other according to whether a vehicle is turned on/off and the parking mode may be changed from the standby mode. In the parking mode, initial parking, short-term parking, and long-term parking may sequentially transition in the stated order, and any sub-mode may transition directly to the standby mode.

Hereinafter, the modes except for a driving mode will be described in more detail with reference to FIGS. 6 to 9. Interruption of all loads is released in a driving mode and, thus, the driving mode will not be separately described here.

Figure 6:
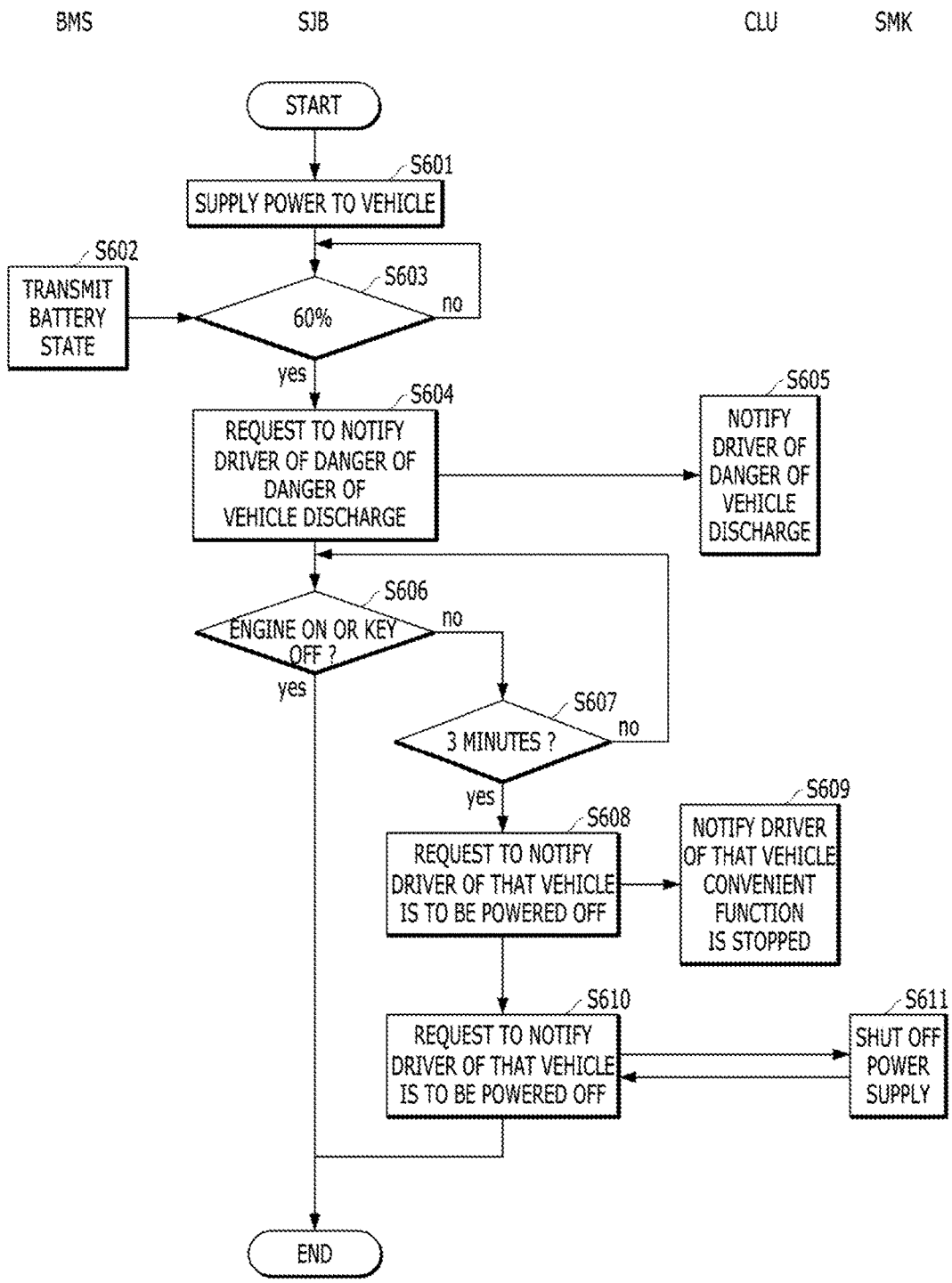
FIG. 6 is a diagram illustrating an example of a procedure for executing a standby mode according to another form of the present disclosure.

FIG. 6 is a diagram illustrating an example of a procedure for executing a standby mode according to another form of the present disclosure. In FIG. 6, arrows and a vertical direction correspond to an order and a horizontal direction corresponds to a component as a subject that performs a corresponding operation.

Referring to FIG. 6, as a key-on status is changed to a key-off status, a standby mode operation is begun. In the standby mode, an SJB performs control to supply power to each load of a vehicle (S601) and a battery sensor transmits battery SOC information to the SJB (S602). When a received SOC value is a predetermined value (e.g., 60%) or less (S603), the SJB may request that cluster notify a driver of danger of vehicle discharge (S604) and, accordingly, the cluster may visually output discharge warning information (S605).

Then, according to whether a vehicle is turned on/off (S606), the SJB may terminate a standby mode and transition to a driving mode in a key-on (engine ON) status, and when a key-off status is maintained for a predetermined time period or more (e.g., 3 minutes) (S607), the SJB may request that the cluster notify a driver of that the vehicle is to be powered off (S608). Accordingly, the cluster may output visual information for notifying the driver of that at least a portion of a vehicle convenient function (S609) is stopped. Then, the SJB may request that a smart key controller shut off power supply and receive a response (S610 and 611) and transition to a parking mode (an initial parking mode).

Figure 7:
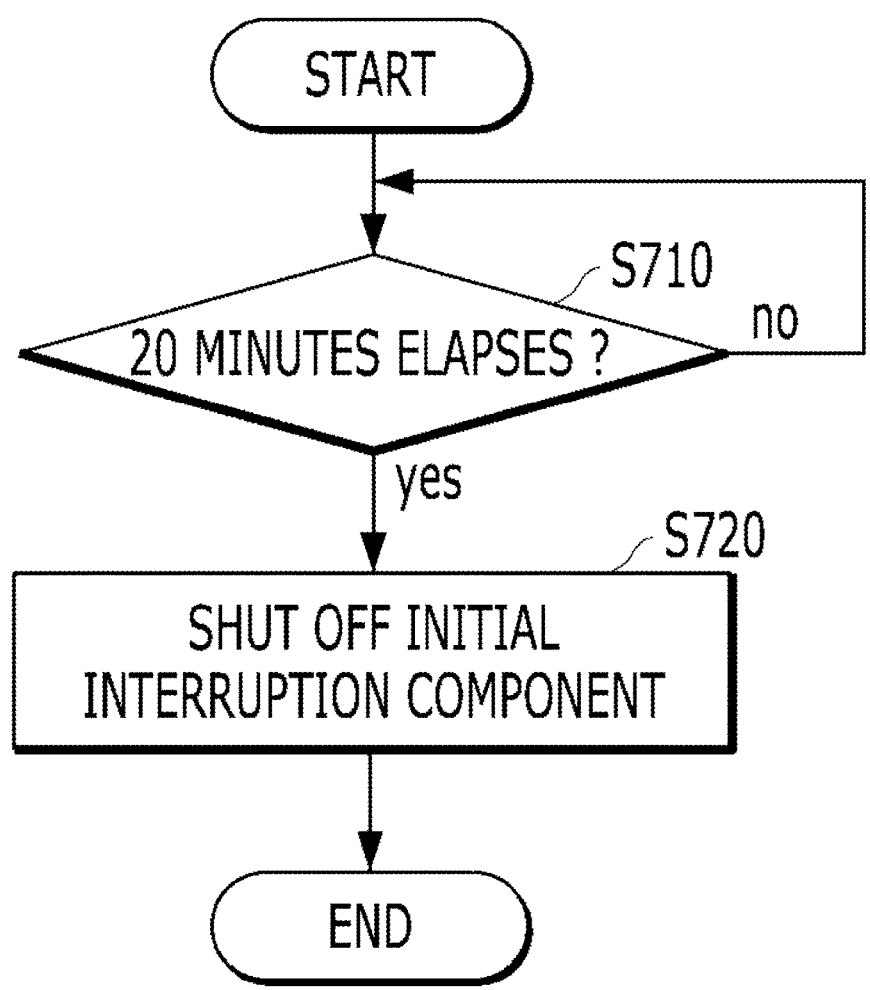
FIG. 7 is a diagram illustrating an example of a procedure for executing an initial parking mode according to another form of the present disclosure.

FIG. 7 is a diagram illustrating an example of a procedure for executing an initial parking mode according to another form of the present disclosure.

Referring to FIG. 7, along with entrance into the initial parking mode, when an SJB initiates a timer and 20 minutes elapses (S710), the SJB may power off an initial interruption component (S720). Here, the initial interruption component may be the aforementioned load group 1, i.e., a lamp load. Then, the SJB may transition to a short-term parking mode.

Figure 8:
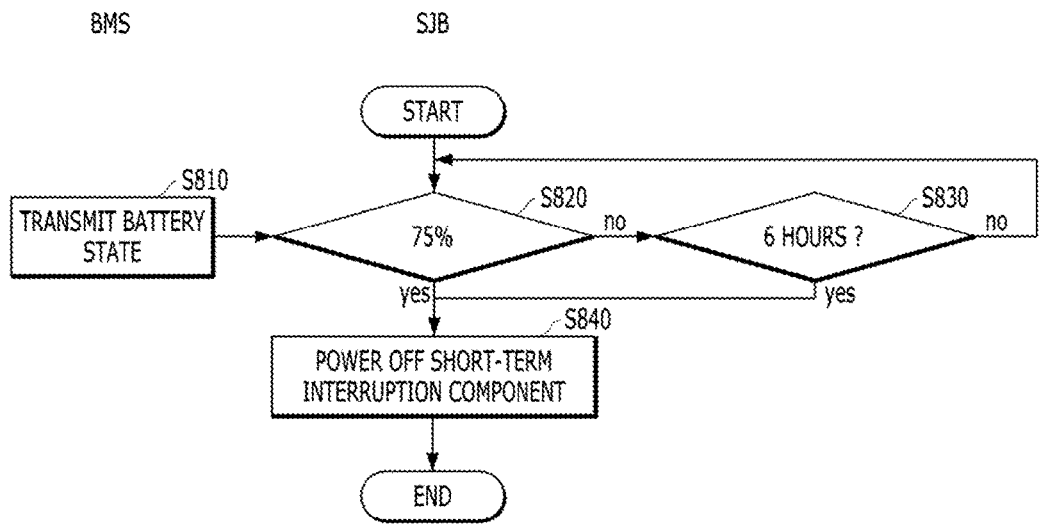
FIG. 8 is a diagram illustrating an example of a procedure for executing a short-term parking mode according to another form of the present disclosure.

FIG. 8 is a diagram illustrating an example of a procedure for executing a short-term parking mode according to another form of the present disclosure.

Referring to FIG. 8, along with entrance into the short-term parking mode, an SJB receives battery state information from a battery sensor (S810) and when the SOC is 75% or less (S820) or a timer reaches six hours (S830), the SJB may power off a short-term interruption component (S840). Here, the short-term interruption component may be the aforementioned load group, i.e., a body load. Then, the SJB may transition to a long-term parking mode.

Figure 9:
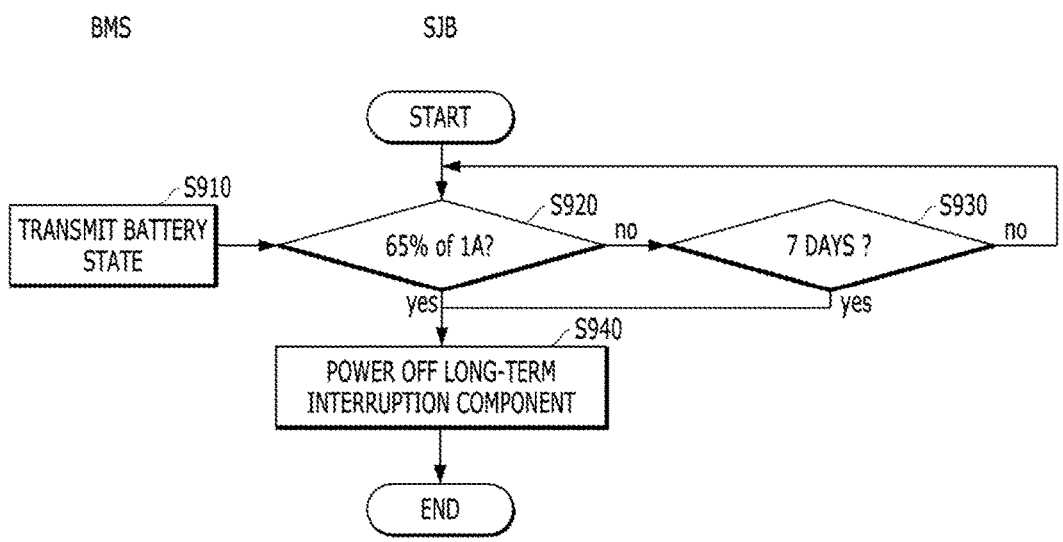
FIG. 9 is a diagram illustrating an example of a procedure for executing a long-term parking mode according to another form of the present disclosure.

FIG. 9 is a diagram illustrating an example of a procedure for executing a lone-term parking mode according to another form of the present disclosure.

Referring to FIG. 9, along with entrance into the long-term parking mode, an SJB receives battery state information from a battery sensor (S910) and when the SOC is 65% or less or dark current is 1 A or more (S920), or a timer reaches seven days (S930), the SJB may power off a long-term interruption component (S940). Here, the long-term interruption component may be the aforementioned load group 3, i.e., a wake-up load.

In the aforementioned FIGS. 8 and 9, operations S810 and S910 of transmitting battery state information by a battery sensor may be first performed when four hours has elapsed after key off and, then, may be performed when an SOC value of a level section is changed every ten minutes, as described above. In addition, when a preset condition is satisfied in each of the aforementioned parking sub-modes, the SJB may re-transition to a standby mode. Here, one of ordinary skill in the art would appreciate that the preset condition may be similarly or differently set to and from a release condition of a sleep mode of a general SJB.

According to at least one form of the present disclosure, the following advantages may be achieved.

Dark current of a vehicle may be effectively shut off so as to prevent unnecessary battery consumption.

In particular, it may be more effective to determine a range of interrupted loads according to a battery state of a vehicle.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

The disclosure can also be embodied as computer readable codes on a computer readable recording medium. The computer readable recording medium is any data storage device that can store programs or data which can be thereafter read by a computer system. Examples of the computer readable recording medium include Hard Disk Drive (HDD), Solid State Disk (SSD), Silicon Disk Drive (SDD), read-only memory (ROM), random-access memory (RAM), CD-ROMs, magnetic tapes, floppy discs, optical data storage devices, and so on. In addition, the computer readable recording medium may be embodied in the form of Internet wave (e.g., transmission over the Internet).

It will be apparent to those skilled in the art that various modifications and variations can be made in the present disclosure without departing from the spirit or scope of the disclosure. Thus, it is intended that the present disclosure covers the modifications and variations of this invention provided they come within the scope of the appended claims and their equivalents.

What is claimed is:

1. A method of controlling an apparatus for managing power of a vehicle, the method comprising:
    cutting off a first load part when a preset first time condition is satisfied;
    additionally cutting off a second load part when a first battery state condition is satisfied;
    additionally cutting off a third load part to cut off all loads when a second battery state condition is satisfied; and
    wherein:
        the first battery state condition comprises a state in which a state of charge (SOC) of a battery is a first value or less and greater than a second value; and
        the second battery state condition comprises a state in which the SOC of the battery is a second value or less.

2. The method according to claim 1, further comprising receiving information on the SOC of the battery from a battery sensor.

3. The method according to claim 2, wherein the battery sensor first transmits information on the SOC to the apparatus for managing power of the vehicle when one hour elapses in a key-off status.

4. The method according to claim 3, wherein the battery sensor detects the SOC of the battery at a second time interval after the first transmitting, and when there is a change from the first battery state condition or the second battery state condition, the battery sensor transmits the information on the SOC to the apparatus for managing power of the vehicle.

5. The method according to claim 2, wherein the battery sensor transmits information on the SOC of the battery as a controller area network (CAN) message.

6. The method according to claim 1, further comprising entering a first mode when a fourth time condition is satisfied in a key-off status,
    wherein the cutting off of the first load part is performed in the first mode.

7. The method according to claim 6, further comprising entering a second mode from the first mode when the first load part is cut off,
    wherein the cutting off of the second load part is performed in the second mode.

8. The method according to claim 7, further comprising entering a third mode from the second mode when the second load part is cut off,
    wherein the interrupting of the third load part is performed in the third mode.

9. A non-transitory computer readable recording medium having recorded thereon a computer executable program instructions that, when executed by a processor, causes the processor to execute the method according to claim 1.

10. An apparatus for managing power of a vehicle, the apparatus comprising:
    a communication module configured to receive a state of charge (SOC) of a battery;
    a microcomputer; and
    an interrupter configured to cut off power supplied to each of at least one load according to control of the microcomputer,
    wherein:
        the microcomputer is configured to control the interrupter to cut off a first load part when a preset first time condition is satisfied;
        the microcomputer is configured to control the interrupter to cut off a second load part when a first battery state condition is satisfied;
        the microcomputer is configured to control the interrupter to cut off a third load part to cut off all loads when a second battery state condition is satisfied;
        wherein the first battery state condition comprises a state in which a state of charge (SOC) of a battery is a first value or less and greater than a second value; and
        wherein the second battery state condition comprises a state in which the SOC of the battery is a second value or less.

11. The apparatus according to claim 10, wherein the communication module is configured to receive information on the SOC of the battery from the battery sensor.

12. The apparatus according to claim 11, wherein the battery sensor is configured to first transmit information on the SOC to the communication module when one hour elapses in a key-off status.

13. The apparatus according to claim 12, wherein the battery sensor is configured to detect the SOC of the battery at a second time interval after the first transmission, and when there is a change from the first battery state condition or the second battery state condition, the battery sensor is configured to transmit the information on the SOC to the communication module.

14. The apparatus according to claim 11, wherein the battery sensor is configured to transmit information on the SOC of the battery as a controller area network (CAN) message.

15. The apparatus according to claim 10, wherein the controller is configured to enter a first mode when a fourth time condition is satisfied in a key-off status and to perform control to cut off the first part load in the first mode.

16. The apparatus according to claim 15, wherein the controller is configured to enter a second mode from the first mode when the first part load is interrupted and to perform control to cut off the second part load in the second mode.

17. The apparatus according to claim 16, wherein the controller is configured to enter a third mode from the second mode when the second part load is cut off and to perform control to cut off the third part load in the third mode.

18. The apparatus according to claim 10, further comprising a smart junction box (SJB).

* * * * *